United States Patent
Khalili Nia et al.

(10) Patent No.: US 9,660,449 B2
(45) Date of Patent: May 23, 2017

(54) POWER SYSTEM SUB-SYNCHRONOUS OSCILLATION DAMPER

(71) Applicant: GL PWRSOLUTIONS, INC., Dallas, TX (US)

(72) Inventors: Hamed Khalili Nia, Dallas, TX (US); Mandhir Sahni, Irving, TX (US); Neeraj Karnik, Richardson, TX (US); Haiping Yin, Irving, TX (US)

(73) Assignee: GL PWRSOLUTIONS, INC., Dallas, TX (US)

( * ) Notice: Subject to any disclaimer, the term of this patent is extended or adjusted under 35 U.S.C. 154(b) by 41 days.

(21) Appl. No.: 14/941,026

(22) Filed: Nov. 13, 2015

(65) Prior Publication Data

US 2016/0141991 A1 May 19, 2016

Related U.S. Application Data

(60) Provisional application No. 62/079,693, filed on Nov. 14, 2014.

(51) Int. Cl.
| | | |
|---|---|---|
| *H02K 11/00* | (2016.01) | |
| *H02J 3/24* | (2006.01) | |
| *H02P 11/00* | (2006.01) | |

(52) U.S. Cl.
CPC .................................... *H02J 3/24* (2013.01)

(58) Field of Classification Search
USPC ...................................... 322/19, 58; 363/44
See application file for complete search history.

(56) References Cited

U.S. PATENT DOCUMENTS

| | | | | |
|---|---|---|---|---|
| 4,047,097 A | * | 9/1977 | Gyugyi | H02J 3/1864 323/211 |
| 4,053,820 A | * | 10/1977 | Peterson | H02J 3/01 307/3 |
| 5,426,354 A | * | 6/1995 | Bausch | H02P 6/20 318/400.02 |

(Continued)

OTHER PUBLICATIONS

M. Sahni, et al., "Sub-Synchronous Interaction in Wind Power Plants—Part II: An ERCOT Case Study", in Power and Energy Society General Meeting, 2012 IEEE, pp. 1-9, Jul. 2012.

(Continued)

*Primary Examiner* — Pedro J Cuevas
(74) *Attorney, Agent, or Firm* — Preti Flaherty Beliveau & Pachios LLP

(57) ABSTRACT

A control circuit for power system sub-synchronous oscillation dampening is described. The control circuit is configured to provide low impedance at sub-synchronous frequencies and high impedance at the fundamental frequency. The control circuit includes an input configured to receive a direct voltage value and a quadrature voltage value. Both the direct voltage value and the quadrature voltage value are based on a three-phase voltage. At least one controller configured to determine a direct current value and a quadrature current value based at least in part on the direct voltage value and the quadrature voltage value is included. The control circuit also includes an output configured to send the direct current value and the quadrature current value as feed forward signals to a control loop for the three-phase voltage.

16 Claims, 13 Drawing Sheets

(56) References Cited

U.S. PATENT DOCUMENTS

| | | | | |
|---|---|---|---|---|
| 5,883,796 | A * | 3/1999 | Cheng | H02J 3/1814 307/105 |
| 7,847,650 | B2 * | 12/2010 | Yao | H03B 27/00 331/117 FE |
| 9,350,281 | B2 * | 5/2016 | Rodiguez | H02P 9/14 |
| 2008/0143446 | A1 * | 6/2008 | Yao | H03B 27/00 331/45 |
| 2015/0326161 | A1 * | 11/2015 | Rodriguez | H02P 9/14 322/19 |
| 2016/0268941 | A1 * | 9/2016 | Rodriguez | H02P 9/14 |

OTHER PUBLICATIONS

Steven W. Saylors, "Understanding and Assessing Subsynchronous Resonance", NAW1308, North American Windpower (2013) http://nawindpower.com/online/issues/NAW1308/FEAT_03_Understanding_And_Assissing_Subsynchronous_Resonance.html.

* cited by examiner

POWER SYSTEM SUB-SYNCHRONOUS OSCILLATION DAMPER

STATEMENT REGARDING FEDERALLY SPONSORED RESEARCH OR DEVELOPMENT

Not Applicable

INTRODUCTION

Various embodiments relate generally to power systems, methods, and computer programs and, more specifically, relate to power system sub-synchronous oscillation dampers.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Sub-synchronous control interaction (SSCI) is a relatively new phenomenon affecting wind generation resources (WGRs) interconnecting in vicinity of series compensated lines in the transmission system. This is an electrical phenomenon involving interaction between wind turbine controls and series compensated lines at sub-synchronous (<60 Hz) frequencies. This issue is mainly observed in WGRs employing Type 3 doubly fed induction generator (DFIG) based turbines.

SSCI may manifest in the form of high magnitude, undamped or negatively damped oscillations in the turbine output when the WGR is radially (or nearly radially) connected to series compensated lines. Such high magnitude oscillations may cause damage to the turbine converters as well as to series capacitors on the transmission system.

One documented instance of SSCI issues occurred in 2009 in the Electric Reliability Council of Texas (ERCOT) region. In this particular instance, wind generators in South Texas were radially connected to series compensated lines causing SSCI issue.

Comprehensive SSCI risk assessments associated with numerous WGR interconnections in ERCOT as well as other transmission grids in North America have been conducted. Comprehensive SSCI investigations have been performed for nearly two gigawatt of WGR interconnections spanning various turbine vendors (See Table 1 below).

Most of the turbine vendors listed in Table 1 are currently engaged in efforts to develop appropriate solutions to mitigate SSCI issues. Further, the availability of non-turbine level solutions to address SSCI issues has been investigated.

TABLE 1

Turbine Vendors Included for SSCI Analysis

| Turbine Vendor | Turbine Size (MW) |
|---|---|
| Vestas | 2 |
| GE | 1.85 |
| Siemens | 2.3 |
| Mitsubishi | 2.4 |
| Acciona | 1.5 & 3 |
| Gamesa | 2 |
| Alstom | 3 |

What is needed is a non-turbine level solution to the SSCI issues.

BRIEF SUMMARY OF THE INVENTION

The below summary is merely representative and non-limiting.

The above problems are overcome, and other advantages may be realized, by the use of the embodiments. Various embodiments provide a power system sub-synchronous oscillation damper (PSSOD) which is a non-turbine level solution to resolve SSCI issues.

In a first aspect, an embodiment provides a control circuit for power system sub-synchronous oscillation damping. The control circuit includes an input configured to receive a direct voltage value and a quadrature voltage value. Both the direct voltage value and the quadrature voltage value are based on a three-phase voltage. At least one controller configured to determine a direct current value and a quadrature current value based at least in part on the direct voltage value, the quadrature voltage value and voltage phase angle derived from phase lock loop (PLL) is included. The control circuit also includes an output configured to send the direct current value and the quadrature current value as feed forward signals to a control loop for the three-phase voltage. The control circuit is configured to provide low impedance at sub-synchronous frequencies and high impedance at the fundamental frequency.

In another aspect, an embodiment provides a sub-synchronous oscillation damper, such as for a power system. The sub-synchronous oscillation damper includes a power input configured to receive an input three-phase voltage. A control circuit is included which has a control circuit input configured to receive a direct voltage value and a quadrature voltage value (both the direct voltage value and the quadrature voltage value are based on the input three-phase voltage); at least one controller configured to determine a direct current value and a quadrature current value based at least in part on the direct voltage value, the quadrature voltage value and voltage phase angle derived from phase lock loop (PLL); and a control circuit output configured to send the direct current value and the quadrature current value as feed forward signals. The control circuit is configured to provide low impedance at sub-synchronous frequencies and high impedance at the fundamental frequency.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

This patent application claims priority from U.S. Provisional Patent Application No. 62/079,693, filed Nov. 17, 2014, the disclosure of which is incorporated by reference herein in its entirety.

One form of SSCI mitigation may involve having a small shunt impedance between the WGR and the series compensated transmission line of interest. The shunt impedance may be relatively small so as to stop low frequency oscillations. However, implementing small static shunt impedances may not be practical in all power systems since a huge amount of fundamental frequency active and reactive power can flow via the shunt impedance.

Alternatively an active device may be used to provide low impedances for sub-synchronous frequencies (e.g., less than 60 Hz) and high impedance for the fundamental frequency (e.g., 60 Hz). Such an active device could employ a filter to eliminate the fundamental frequency from control signals. Based on signal processing theory, designing a perfect filter with no phase shift was a non-trivial task. In conventional systems, the phase shift in the frequency range of interest, introduced by practical filter designs, can significantly decrease the design performance and in some situations can make the system unstable.

In recognition of the challenges outlined above, various embodiments provide a filter-less bidirectional device for SSCI mitigation which is able to provide adjustable apparent impedance in the frequency range of interest (sub-synchronous frequencies). A difference between these embodiments in comparison to static volt ampere reactive (VAR) compensators (SVCs) or static synchronous compensators (STATCOMs) is that such SVC/STATCOM devices focus on the fundamental frequency and, in contrast, these embodiments provide adjustable apparent impedance at the sub-synchronous frequencies. The conventional devices may also have infinite impedance for sub-synchronous frequencies so they have no impact (or even an adverse impact) on SSCI mitigation without significant modification of control schemes.

Various embodiments include PSSODs that use bus voltages as a feedback signal and calculate appropriate currents to inject into the bus thereby representing an imaginary impedance for the sub-synchronous frequencies.

Figure 1:
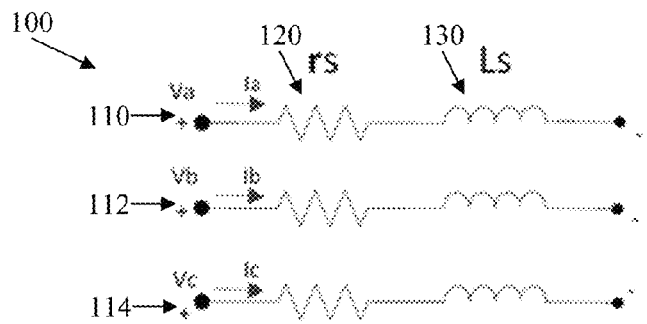
FIG. 1 demonstrates a series resistor-inductor (RL) circuit in the abc domain.

FIG. 1 shows a series resistor-inductor (RL) circuit 100 in the abc domain. The circuit 100 includes three inputs 110, 112, 114, a first input 110 provided with a voltage, $v_a$, and a current, $I_a$. Likewise, the second input 112 is provided with a voltage, $v_b$, and a current, $I_b$ and the third input 114 is provided with a voltage, $v_c$, and a current, $I_c$. The circuit also includes a resistance element 120, rs, and an inductive element 130, Ls.

The equations of this circuit in a dq reference frame can be written as Equation 1:

$$\begin{cases} v_{qs} = r_s i_{qs} + \omega L_s i_{ds} + L_s p i_{qs} \\ v_{ds} = r_s i_{ds} \pm \omega L_s i_{qs} + L_s p i_{ds} \\ v_{0s} = r_s i_{0s} + L_s p i_{0s} \end{cases} \quad (1)$$

Taking Laplace transform on both sides of Equation 1 results in:

$$\begin{cases} V_{qs}(s) = [r_s + L_s s] I_{qs}(s) + \omega L_s I_{ds}(s) \\ V_{ds}(s) = [r_s + L_s s] I_{ds}(s) - \omega L_s I_{qs}(s) \\ V_{0s}(s) = [r_s + L_s s] I_{0s}(s) \end{cases} \quad (2)$$

Equation 2 may be described in matrix form as:

$$\begin{bmatrix} V_{qs}(s) \\ V_{ds}(s) \end{bmatrix} = \begin{bmatrix} r_s + L_s s & \omega L_s \\ -\omega L_s & r_s + L_s s \end{bmatrix} \begin{bmatrix} I_{qs}(s) \\ I_{ds}(s) \end{bmatrix} \quad (3)$$

$$V_{0s}(s) = [r_s + L_s s] I_{0s}(s)$$

Using Equation 3, current signals based on voltage signals can be obtained as:

$$\begin{bmatrix} I_{qs}(s) \\ I_{ds}(s) \end{bmatrix} = \frac{1}{(r_s + L_s s)^2 + (\omega L_s)^2} \begin{bmatrix} r_s + L_s s & -\omega L_s \\ \omega L_s & r_s + L_s s \end{bmatrix} \begin{bmatrix} V_{qs}(s) \\ V_{ds}(s) \end{bmatrix} \quad (4)$$

-continued $$\begin{bmatrix} I_{qs}(s) \\ I_{ds}(s) \end{bmatrix} = \begin{bmatrix} \frac{r_s + L_s s}{(r_s + L_s s)^2 + (\omega L_s)^2} & \frac{-\omega L_s}{(r_s + L_s s)^2 + (\omega L_s)^2} \\ \frac{\omega L_s}{(r_s + L_s s)^2 + (\omega L_s)^2} & \frac{r_s + L_s s}{(r_s + L_s s)^2 + (\omega L_s)^2} \end{bmatrix} \begin{bmatrix} V_{qs}(s) \\ V_{ds}(s) \end{bmatrix} \quad (5)$$

$$\begin{cases} I_{qs}(s) = \frac{L_s s + r_s}{L_s^2 s^2 + 2 r_s L_s s + r_s^2 + (\omega L_s)^2} V_{qs}(s) + \\ \qquad \frac{-\omega L_s}{L_s^2 s^2 + 2 r_s L_s s + r_s^2 + (\omega L_s)^2} V_{ds}(s) \\ I_{ds}(s) = \frac{\omega L_s}{L_s^2 s^2 + 2 r_s L_s s + r_s^2 + (\omega L_s)^2} V_{qs}(s) + \\ \qquad \frac{L_s s + r_s}{L_s^2 s^2 + 2 r_s L_s s + r_s^2 + (\omega L_s)^2} V_{ds}(s) \\ I_{0s}(s) = \frac{1}{L_s s + r_s} V_{0s}(s) \end{cases} \quad (6)$$

Based on Equation 6, $I_d$ and $I_q$ of a series RL circuit are related to $V_d$ and $V_q$ by two (2) second order transfer functions. If currents calculated using Equation 6 are injected into one of the buses of the network, an imaginary series RL circuit can be modeled at that bus. By adjusting the parameters of the second order transfer functions an adjustable series RL circuit can be obtained. Using Equation 6, a constant series RL circuit may be modeled for all frequencies.

As discussed above, the fundamental frequency should be excluded from Equation 6 to prevent the flow of fundamental frequency active and reactive power flowing into the circuit. To do this, the fundamental frequency voltage from feedback signals is simply rejected. As all equations are in voltage dq-0 reference frame (using a phase-locked-loop (PLL) which is synchronized to voltage signals), the $V_d$ component of the fundamental voltage signal is always zero and the $V_q$ component of the fundamental frequency is a constant which is directly related to the root mean square (RMS) value of the bus voltage. Based on this, by simply removing the DC value of the $V_q$ component the fundamental frequency voltage can be eliminated from the feedback signal.

To perfectly remove the DC value from the $V_q$ signal a high pass filter can be implemented. However, as mentioned earlier, the high pass filter can introduce phase shift on the frequency range of interest adversely impacting the performance of the controller.

For this reason, in some embodiments the DC value of the $V_q$ signal is simply removed by subtracting it from the voltage RMS reference value. Then the difference between the $V_q$ and the RMS reference value can be compensated using the original control loops of the device.

Figure 2:
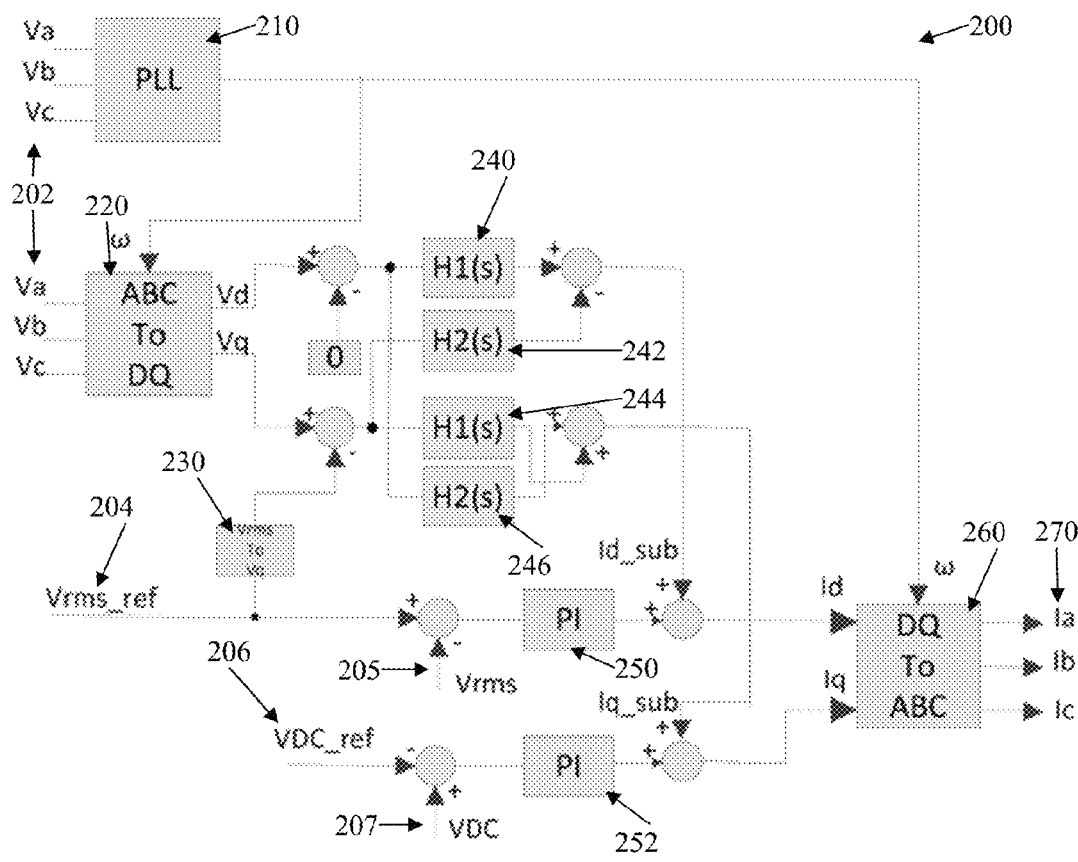
FIG. 2 shows the block diagram of a non-limiting example of a PSSOD controller in accordance with an embodiment.

FIG. 2 shows a block diagram of a non-limiting example of a PSSOD controller 200 in accordance with an embodiment. The $I_d$-sub and $I_q$-sub elements are obtained by implementing Equation 6 and subtracting the RMS value of the voltage signal from $V_q$. $I_d$-sub and $I_q$-sub are added as feed forward signals to the original control loops.

Sample design specifications:
To prevent controller interaction between feed forward control loops and original control loops, the proportional-integral (PI) controllers 250, 252 of the original control loop should be slow.
In a pulse-width modulation (PWM) switching design, the step-up transformer can have a lower impedance percentage as compared to the desired imaginary reactance for the sub-synchronous synchronous frequencies. A smaller value makes the system stronger but uses a bigger and more expensive transformer (with smaller leakage reactance). However, the performance of the PSSOD could be improved with a smaller transformer impedance. There is a trade-off in choosing the desired imaginary reactance value.

The capacitor DC link should be high enough to tolerate active power oscillations.

Elements 240 and 244 implement Equation 7:

$$H_1(s) = \frac{L_s s + r_s}{L_s^2 s^2 + 2 r_s L_s s + r_s^2 + (\omega L_s)^2} \quad (7)$$

Elements 242 and 246 implement Equation 8:

$$H_2(s) = \frac{\omega L_s}{L_s^2 s^2 + 2 r_s L_s s + r_s^2 + (\omega L_s)^2} \quad (8)$$

The PI controllers 250, 252 implements $$PI = 0.1 + \frac{0.001}{s}, \quad (9)$$

$$K_{vrm\,to\,vq} = -28.169$$

As shown in FIG. 2, the PSSOD 200 includes a PLL 210 which receives the three phase voltage 202 and provides an output signal, ω, representative of the phase of the voltage. The ABC to DQ converter 220 receives the three phase voltage 202 and the output signal, w, from the PLL 210 and provides the $V_d$ and $V_q$ signals. The $V_d$ and $V_q$ signals are provided to elements 240, 242, 244 and 246 (with an output from the $V_{rms}$ to $V_q$ converter 230) to generate representing the $I_{d\,sub}$ and $I_{q\,sub}$ signals.

The PI controllers 250, 252 receive the $V_{rms\,reference}$ 204 and $V_{DC\,reference}$ 206 signals once combined with the $V_{rms}$ 205 and $V_{DC}$ 207 signals. In turn, the output from the PI controllers 250, 252 is combined with the $I_{d\,sub}$ and $I_{q\,sub}$ signals and provided to the DQ to ABC converter 260 as $I_d$ and $I_q$ inputs. The DQ to ABC converter 260 then provides the three phase current output 270.

Figure 3:
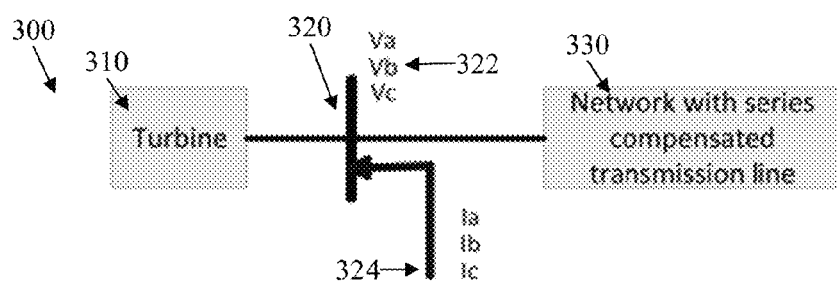
FIG. 3 illustrates part of power system in which PSSOD controller can be implemented.

FIG. 3 shows part of a power system in which a PSSOD could be implemented. The turbine 310 provides energy to the system which is routed through an interconnect with a PSSOD controller 200 in service before being transmitted to a network 330 with series compensated transmission lines. The PSSOD controller 200 receives a three phase voltage 322 in the abe-domain and generates appropriate reference currents 324 which may be injected into the system for SSCI mitigation.

Testing of PSSOD Using Generic DFIG Turbine Model

A model for the PSSOD was created using software tools such as PSCAD/EMTDC. This model is tested using a simple radial test system. The test system consists of a long transmission line with variable series compensation as depicted in Table 2. Six (6) scenarios are included for testing (Refer to Table 2). Simulation results are presented in the ensuing sections of this document.

TABLE 2

PSSOD Testing Scenarios

| Scenario# | Compensation Level on Radial Test System (%) | PSSOD status |
| --- | --- | --- |
| 1 | 30 | Out of service |
| 2 | 30 | In service |
| 3 | 50 | Out of service |
| 4 | 50 | In service |
| 5 | 70 | Out of service |
| 6 | 70 | In service |

Figure 4:
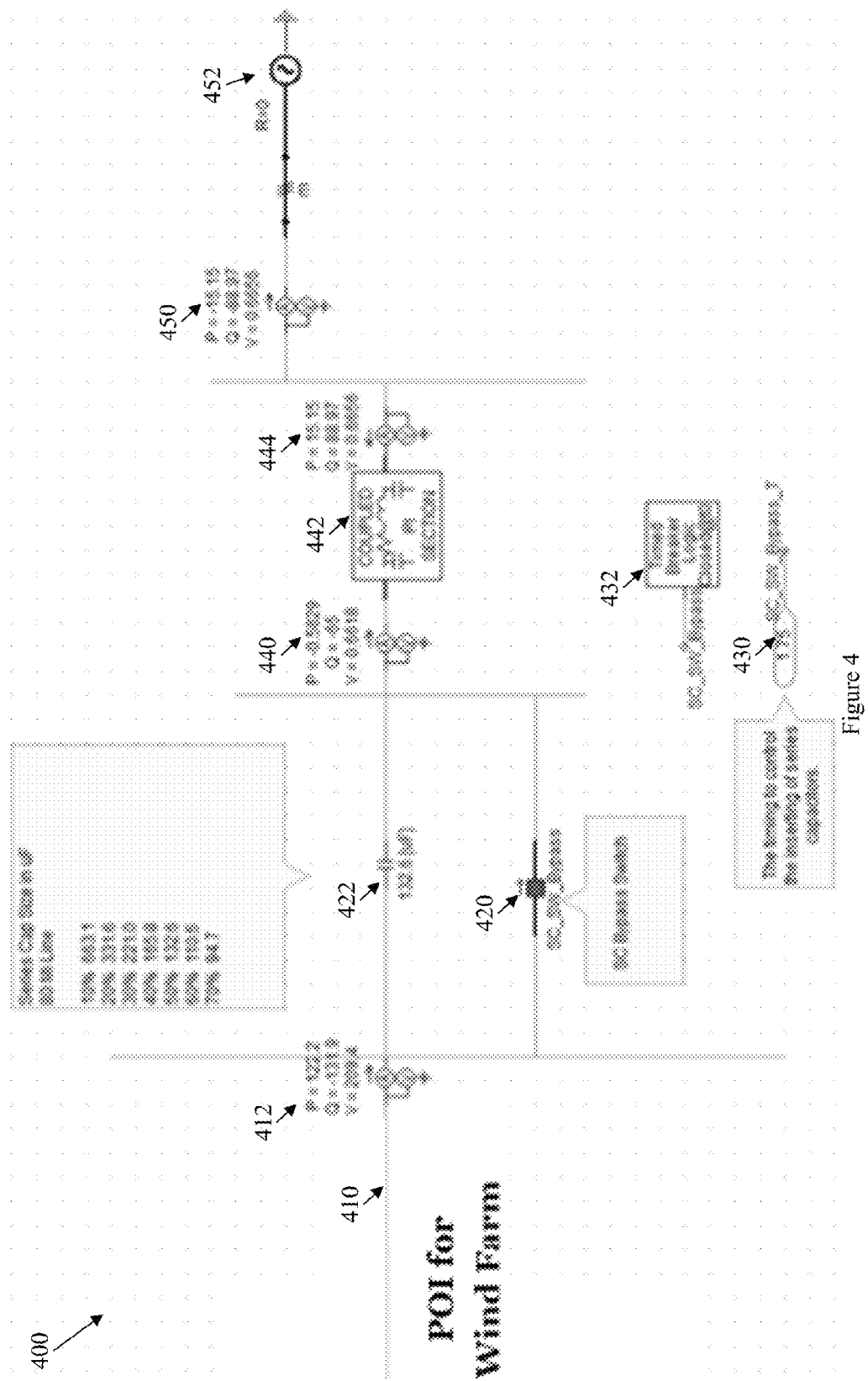
FIG. 4 illustrates a one-line schematic of a radial typical test system.

FIG. 4 illustrates a one-line schematic 400 of a radial typical test system. The point of interconnection for the wind farm is at 410 and the current and voltage are measured at 412 for monitoring purposes. A series capacitor 422 and a series capacitor (SC) bypass switch 420 are provided in parallel. An SC bypass switch timer 430 is used with a timed breaker logic 432 to control the inserting of the capacitor 422. The current and voltage are measured again at 440 prior to a coupled PI section 442 considered to represent transmission line. Current and voltage measurements are performed at points 444 and 450 prior to the equivalent network voltage 452.

Figure 9:
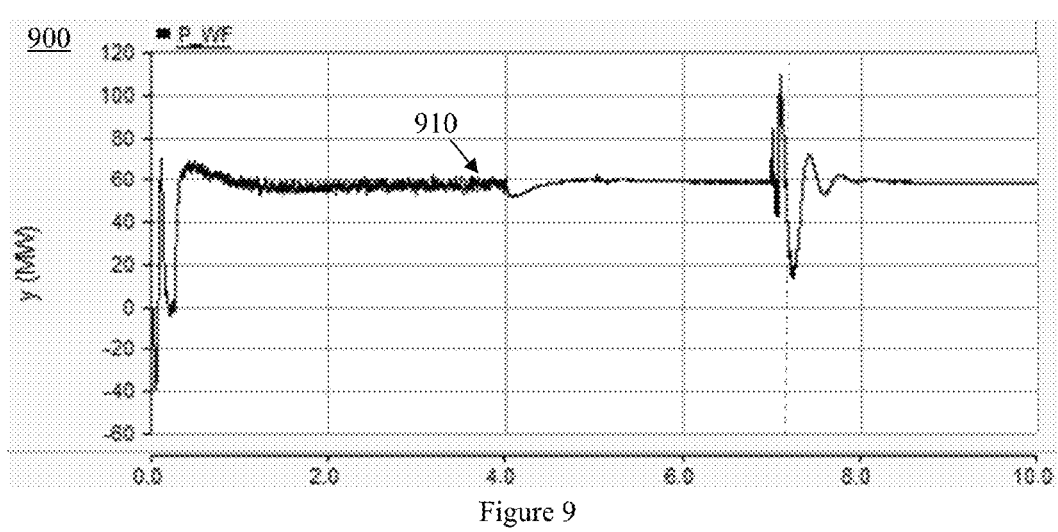
FIG. 9 is a graph of active power (P) over time in a 30% compensation level system with a PSSOD in accordance with an embodiment.
Figure 10:
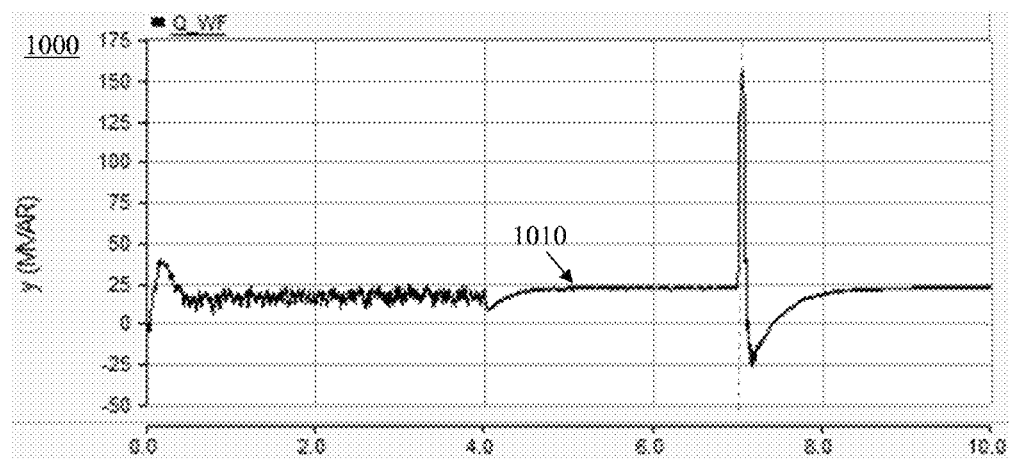
FIG. 10 is a graph of reactive power (Q) over time in a 30% compensation level system with a PSSOD in accordance with an embodiment.
Figure 11:
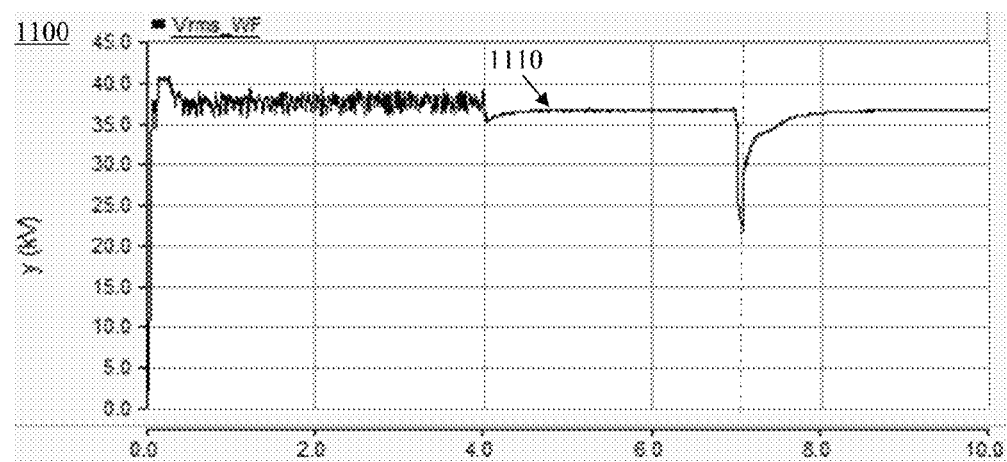
FIG. 11 is a graph of voltage (Vrms) over time in a 30% compensation level system with a PSSOD in accordance with an embodiment.

This power system without a PSSOD in service depicts the Sub-Synchronous Oscillations (SSO) based on the interaction of the generic Type 3 wind turbines and series compensated lines. The SSO are manifested in the active and reactive power output of the turbines and wind farm. As seen in FIGS. 5-8, Scenario 1 analysis confirms that the dominant mode of oscillation does have a frequency below 60 Hz e.g., SSO. FIGS. 9-11, showing Scenario 2, demonstrate that the presence of the PSSOD damps out the SSO and no such oscillations are observed. The remaining scenarios, FIGS. 12-25, demonstrate the ability of various embodiments of the PSSOD to damp out sub synchronous oscillations.

Scenario 1: 30% Compensation Level without PSSOD

Figure 5:
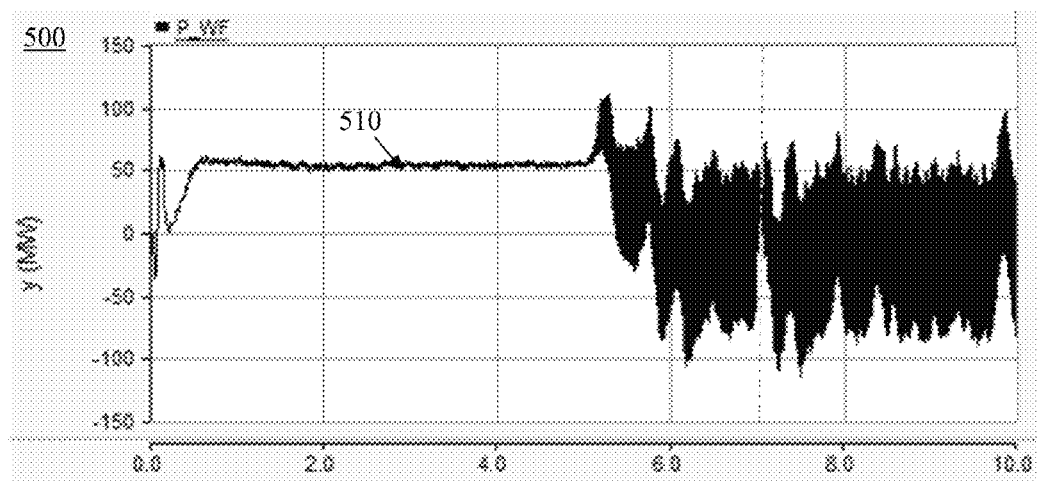
FIG. 5 is a graph of active power (P) over time in a 30% compensation level system without a PSSOD.
Figure 6:
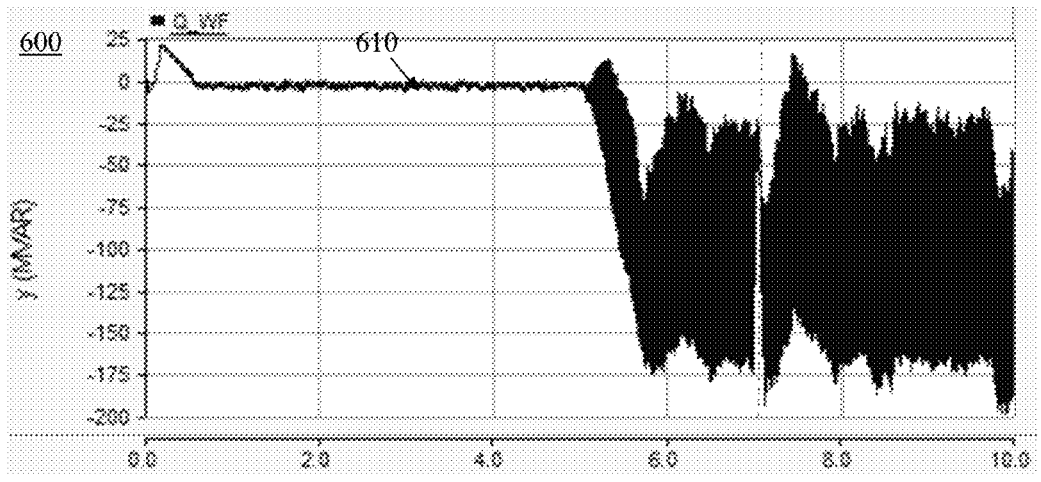
FIG. 6 is a graph of reactive power (Q) over time in a 30% compensation level system without a PSSOD.
Figure 7:
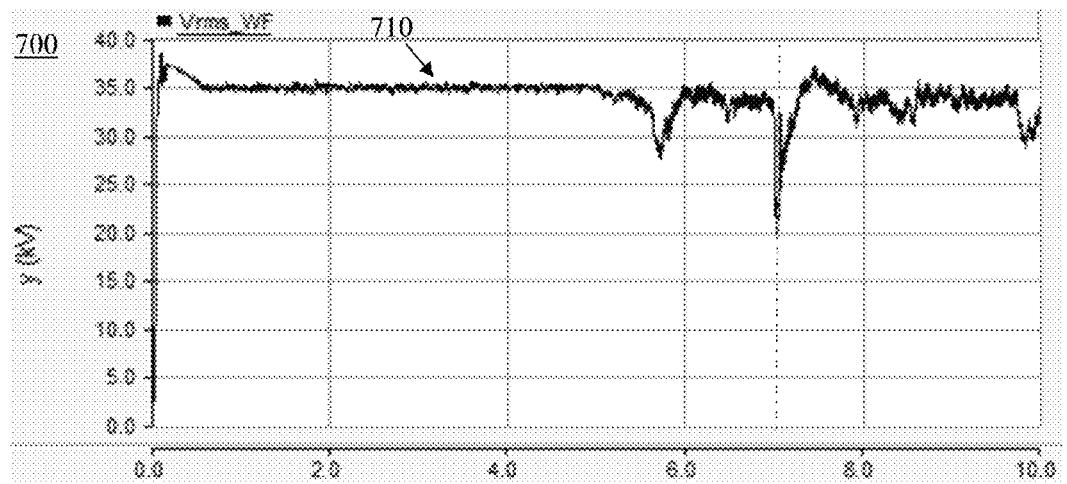
FIG. 7 is a graph of voltage (Vrms) over time in a 30% compensation level system without a PSSOD.

In this scenario, there is WGR radial to series compensation at t=5 sec and a 3 phase to ground fault at t=7 sec. Graph 500 in FIG. 5 shows the P 510, graph 600 in FIG. 6 shows Q 610 and graph 700 in FIG. 7 shows the Vrms 710.

Figure 8:
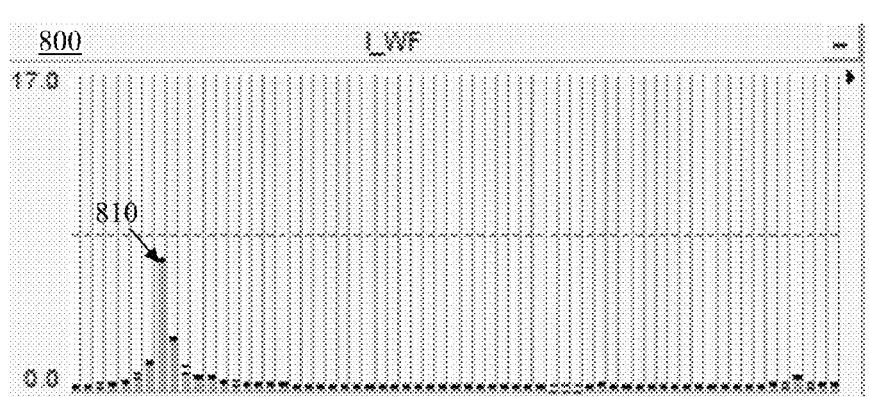
FIG. 8 is a graph of Fast Frequency Transform (FFT) of turbine current after clearing fault in a 30% compensation level system without a PSSOD.

Graph 800 in FIG. 8 shows the Fast Frequency Transform (FFT) 810 of turbine current after a clearing fault.

Scenario 2: 30% Compensation Level with PSSOD

This scenario is similar to Scenario 1 except that the PSSOD was activated at t=4 sec. Accordingly, the system is radial at t=5 sec. There is still a 3 phase to ground fault at t=7 sec. Graph 900 in FIG. 9 shows the P 910, graph 1000 in FIG. 10 shows Q 1010 and graph 1100 in FIG. 11 shows the Vrms 1110.

Scenario 3: 50% Compensation Level without PSSOD

Figure 12:
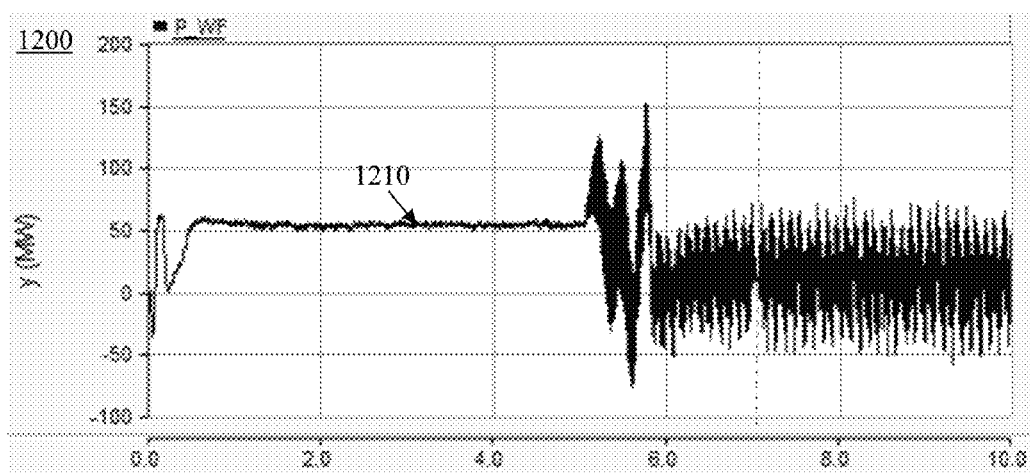
FIG. 12 is a graph of active power (P) over time in a 50% compensation level system without a PSSOD.
Figure 13:
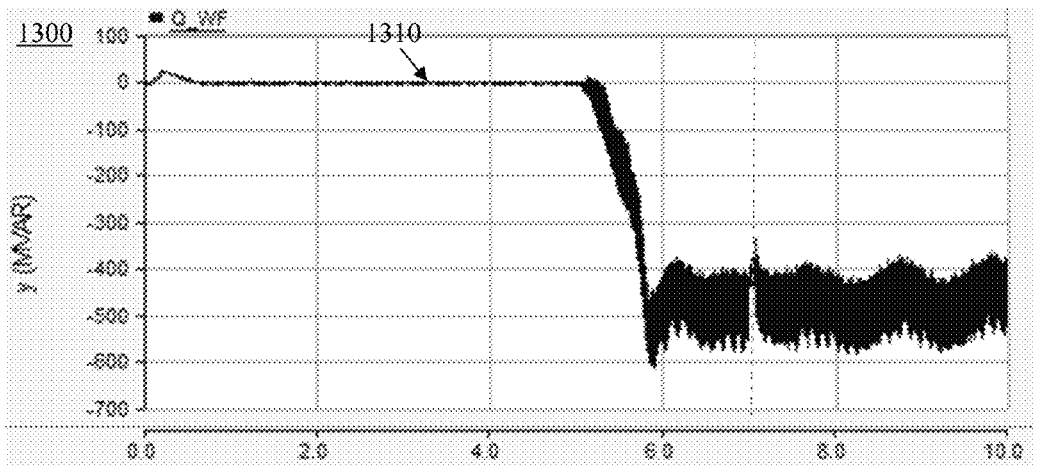
FIG. 13 is a graph of reactive power (Q) over time in a 50% compensation level system without a PSSOD.
Figure 14:
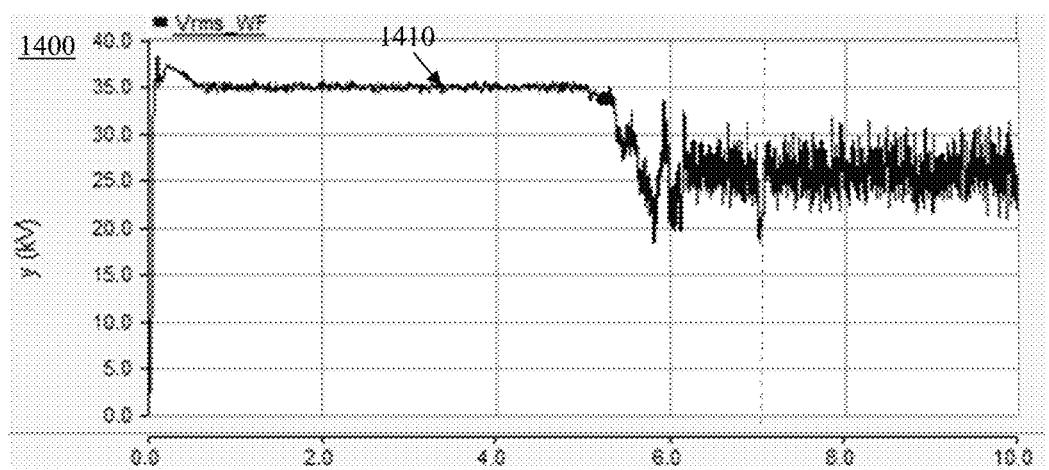
FIG. 14 is a graph of voltage (Vrms) over time in a 50% compensation level system without a PSSOD.

In this scenario, graph 1200 in FIG. 12 shows the P 1210, graph 1300 in FIG. 13 shows Q 1310 and graph 1400 in FIG. 14 shows the Vrms 1410.

Figure 15:
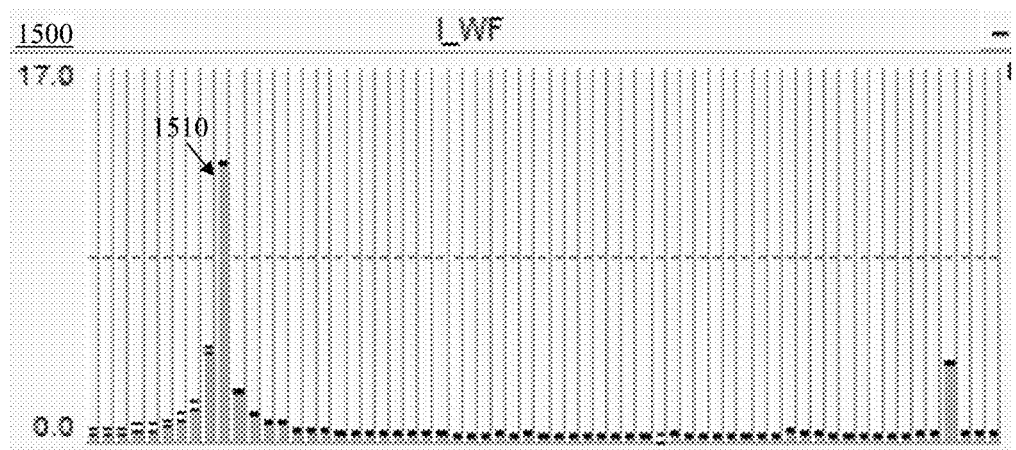
FIG. 15 is a graph of Fast Frequency Transform (FFT) of turbine current after clearing fault in a 50% compensation level system without a PSSOD.

Graph 1500 in FIG. 15 shows the Fast Frequency Transform (FFT) 1510 of turbine current after a clearing fault.

Scenario 4: 50% Compensation Level with PSSOD

Figure 16:
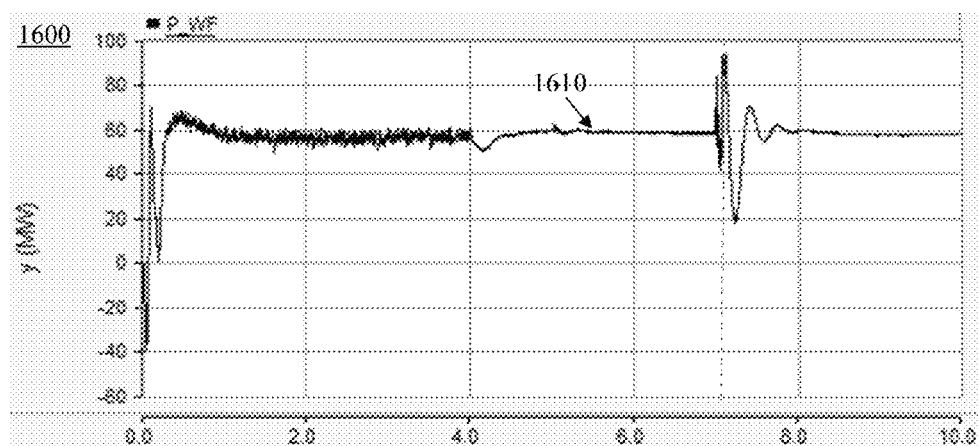
FIG. 16 is a graph of active power (P) over time in a 50% compensation level system with a PSSOD in accordance with an embodiment.
Figure 17:
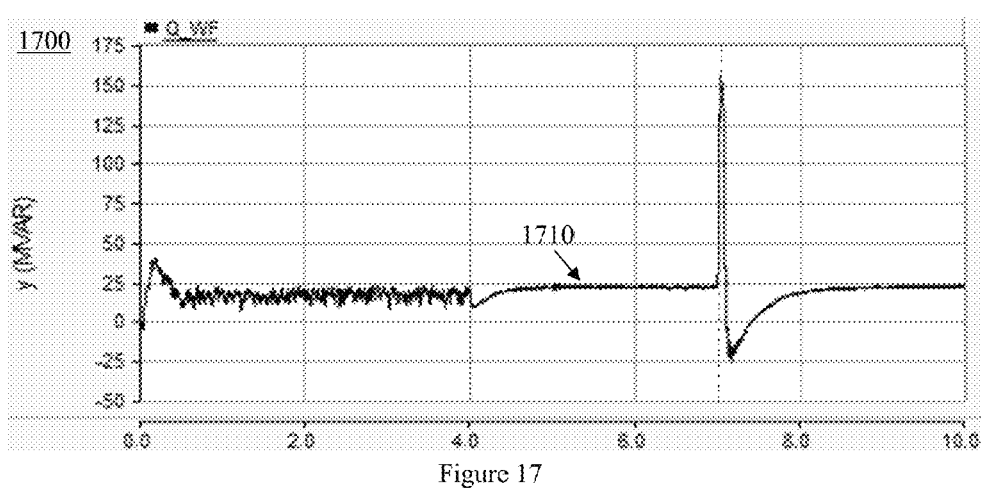
FIG. 17 is a graph of reactive power (Q) over time in a 50% compensation level system with a PSSOD in accordance with an embodiment.
Figure 18:
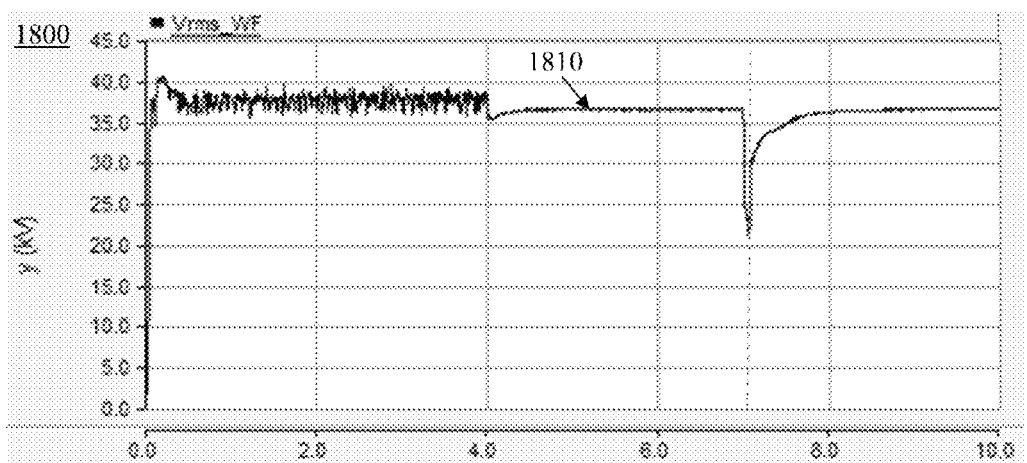
FIG. 18 is a graph of voltage (Vrms) over time in a 50% compensation level system with a PSSOD in accordance with an embodiment.

This scenario is similar to Scenario 3 except that the PSSOD was activated. Graph 1600 in FIG. 16 shows the P 1610, graph 1700 in FIG. 17 shows Q 1710 and graph 1800 in FIG. 18 shows the Vrms 1810.

Scenario 5: 70% Compensation Level without PSSOD

Figure 19:
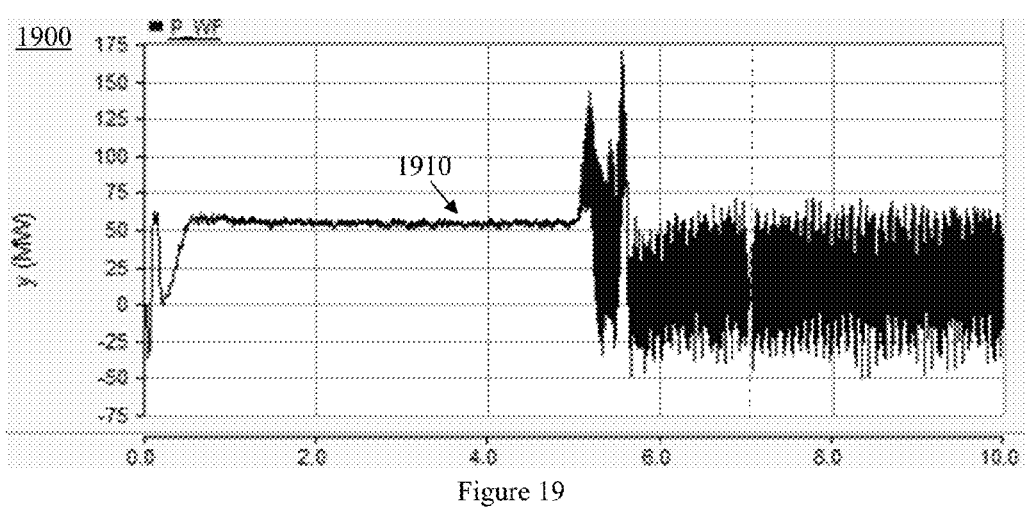
FIG. 19 is a graph of active power (P) over time in a 70% compensation level system without a PSSOD.
Figure 20:
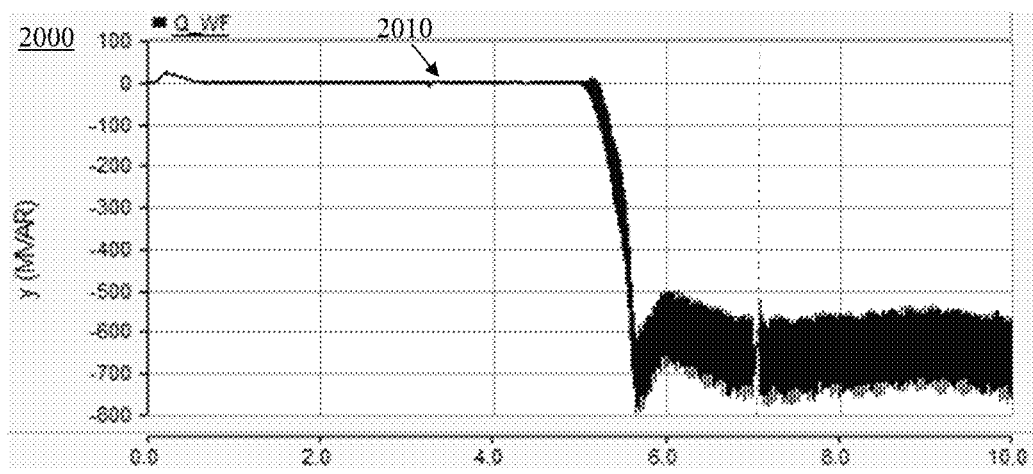
FIG. 20 is a graph of reactive power (Q) over time in a 70% compensation level system without a PSSOD.
Figure 21:
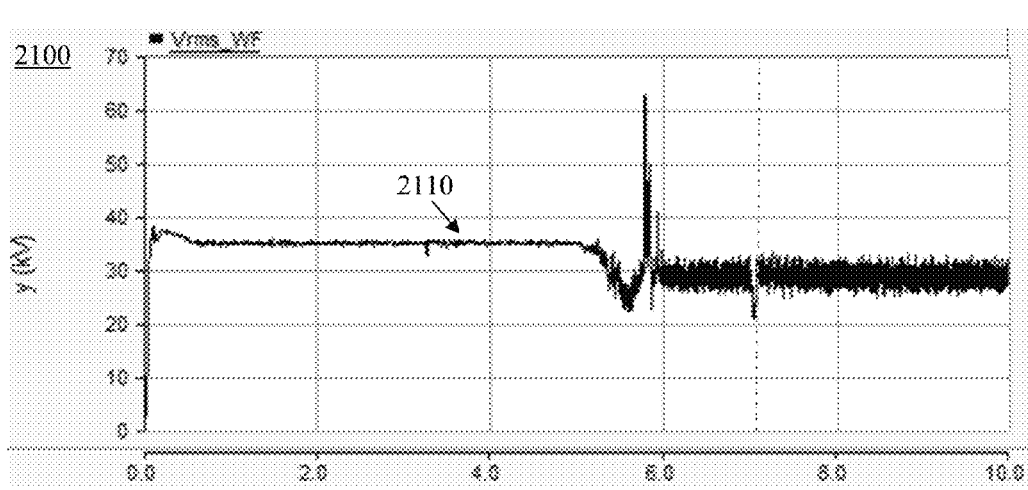
FIG. 21 is a graph of voltage (Vrms) over time in a 70% compensation level system without a PSSOD.

In this scenario, graph 1900 in FIG. 19 shows the P 1910, graph 2000 in FIG. 20 shows Q 2010 and graph 2100 in FIG. 21 shows the Vrms 2110.

Figure 22:
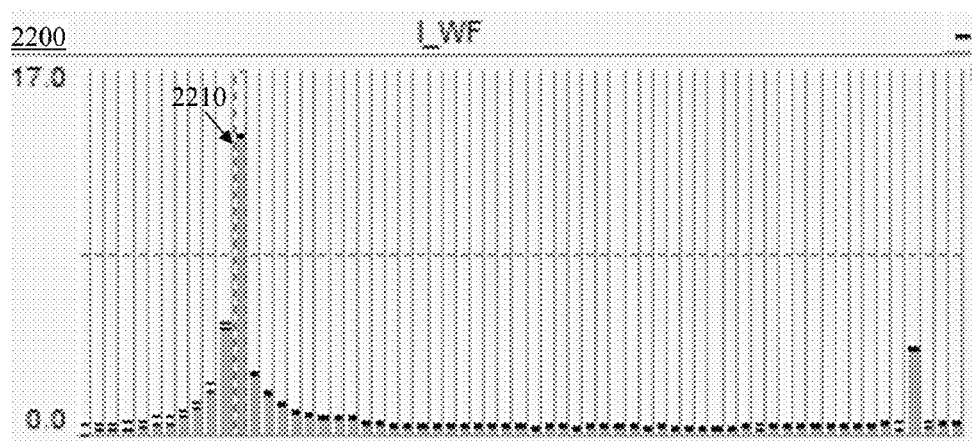
FIG. 22 is a graph of Fast Frequency Transform (FFT) of turbine current after clearing fault in a 70% compensation level system without a PSSOD.

Graph 2200 in FIG. 22 shows the Fast Frequency Transform (FFT) 2210 of turbine current after a clearing fault.

Scenario 6: 70% Compensation Level with PSSOD

Figure 23:
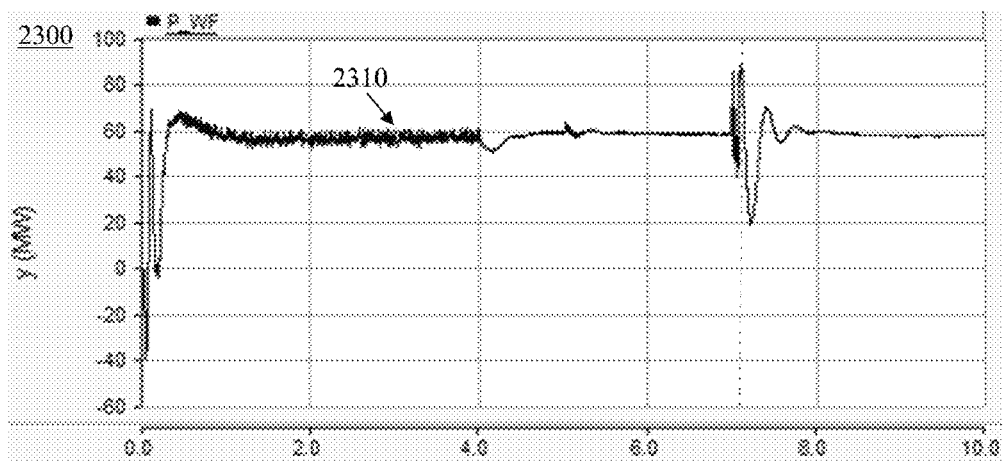
FIG. 23 is a graph of active power (P) over time in a 70% compensation level system with a PSSOD in accordance with an embodiment.
Figure 24:
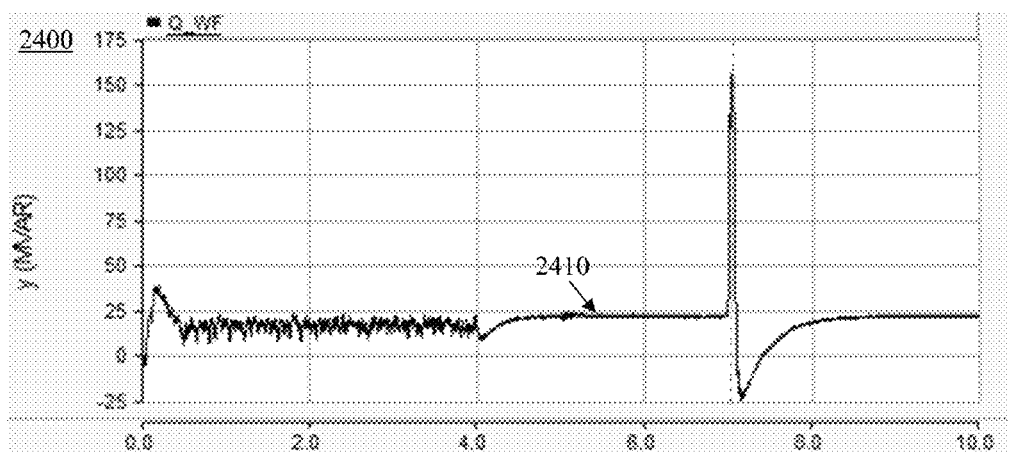
FIG. 24 is a graph of reactive power (Q) over time in a 70% compensation level system with a PSSOD in accordance with an embodiment.
Figure 25:
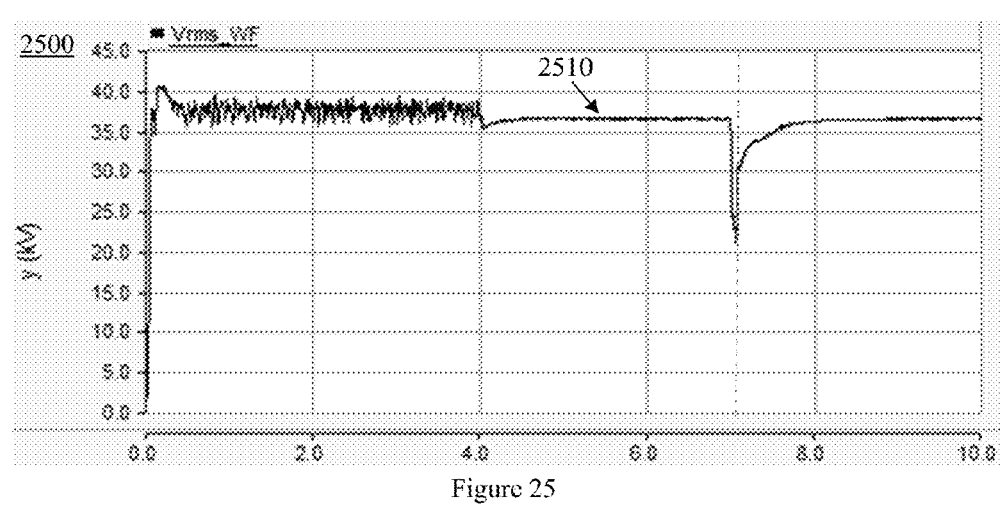
FIG. 25 is a graph of voltage (Vrms) over time in a 70% compensation level system with a PSSOD in accordance with an embodiment.

This scenario is similar to Scenario 5 except that the PSSOD was activated. Graph 2300 in FIG. 23 shows the P 2310, graph 2400 in FIG. 24 shows Q 2410 and graph 2500 in FIG. 25 shows the Vrms 2510.

Various embodiment of the PSSOD design provide numerous advantages including:

An active filter-less current compensation based approach to mitigate against SSCI issues;

The ability to mitigate against SSCI issues with minimal interference/impact on the fundamental frequency operation;

A second-order transfer function based implementation of an imaginary RL circuit connected in shunt with the system of interest;

Ability to provide voltage/reactive power control capability in addition to the SSCI mitigation; and Utilization of the DC component of the $V_q$ to completely eliminate the fundamental frequency component from the control signals—in the absence of any filters.

As described above, various embodiments provide a method, apparatus and computer program(s) to provide power system sub-synchronous oscillation dampening.

Figure 26:
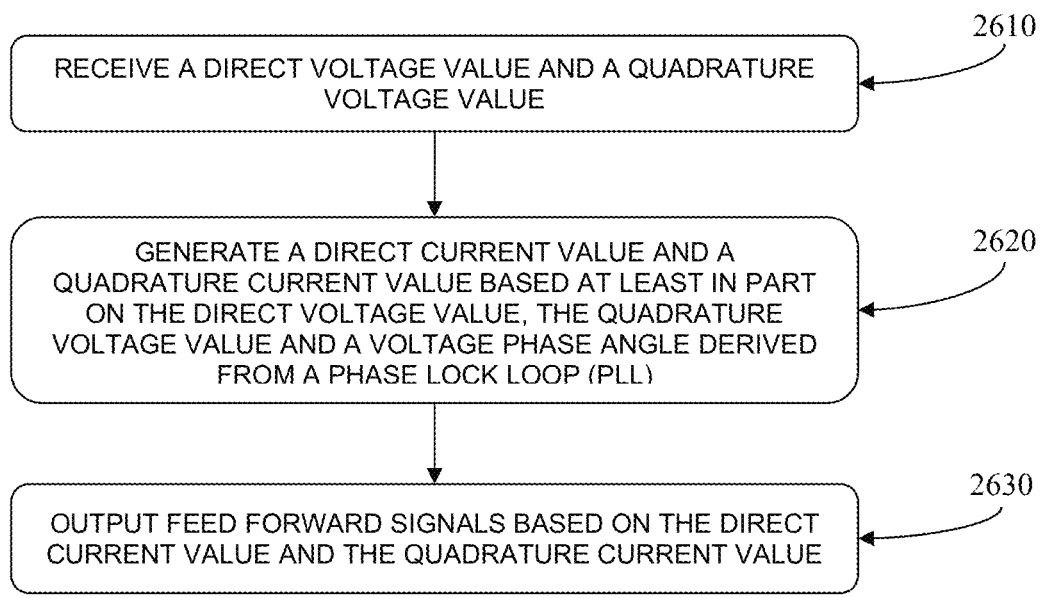
FIG. 26 is a logic flow diagram that illustrates a method, and a result of execution of computer program instructions, in accordance with various embodiments.

FIG. 26 is a logic flow diagram that illustrates a method, and a result of execution of computer program instructions, in accordance with various embodiments. In accordance with an embodiment a method performs, at Block 2610, a step of receiving a direct voltage value and a quadrature voltage value. Both the direct voltage value and the quadrature voltage value are based on an input three-phase voltage. A direct current value and a quadrature current value are generated based at least in part on the direct voltage value, the quadrature voltage value and voltage phase angle derived from phase lock loop (PLL) at Block 2620. At Block 2630, the method performs a step of outputting feed forward signals based on the direct current value and the quadrature current value. According to the feed forward signals, low impedance is to be provided at sub-synchronous frequencies and high impedance is to be provided at the fundamental frequency.

The various blocks shown in FIG. 26 may be viewed as method steps, as operations that result from use of computer program code, and/or as one or more logic circuit elements constructed to carry out the associated function(s).

A first embodiment provides a control circuit for power system sub-synchronous oscillation damping. The control circuit is filter-less bidirectional circuit configured to provide low impedance at sub-synchronous frequencies and high impedance at a fundamental frequency. The control circuit is configured to receive a direct voltage value and a quadrature voltage value. Both the direct voltage value and the quadrature voltage value are based on a three-phase voltage. The control circuit determines a direct current value and a quadrature current value based on a) the direct voltage value; and b) the quadrature voltage value; and c) voltage phase angle derived from phase lock loop (PLL). The control circuit then sends the direct current value and the a quadrature current value as feed forward signals to a control loop for the three-phase current, for example, at an interconnect between the plurality of wind generation resources and series compensated lines in a transmission system.

In a further embodiment of the control circuit above, the control circuit is configured to subtract a root mean square voltage reference value of the three-phase voltage from the quadrature voltage value.

In another embodiment of any one of the control circuits above, the control circuit is connected to a first conversion circuit configured to receive the three-phase voltage; and convert the three-phase voltage into the direct voltage value and the quadrature voltage value.

In a further embodiment of any one of the control circuits above, the control circuit is connected to a second conversion circuit configured to generate a three-phase current based at least in part on the feed forward current.

In another embodiment of any one of the control circuits above, the control circuit is configured to determine the direct current value and the quadrature current value using equation (6).

Another embodiment is power system sub-synchronous oscillation damper which includes any one of the control circuits above.

In a further embodiment of the PSSOD above, the PSSOD includes the first conversion circuit and the second conversion circuit.

In another embodiment of any one of the PSSODs above, the PSSOD is connected at an interconnect between a wind farm collector station and series compensated lines in a power transmission system.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. It will be further appreciated by those of ordinary skill in the art that modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A control circuit comprising:
an input configured to receive a direct voltage value and a quadrature voltage value, wherein both the direct voltage value and the quadrature voltage value are based on a three-phase voltage;
at least one controller configured to determine a direct current value and a quadrature current value based at least in part on the direct voltage value, the quadrature voltage value and a voltage phase angle derived from a phase lock loop (PLL); and
an output configured to send the direct current value and the quadrature current value as feed forward signals to a control loop for the three-phase current,
wherein the control circuit is configured to provide low impedance at sub-synchronous frequencies and high impedance at a fundamental frequency.

2. The control circuit of claim 1, further comprising a processing component configured to subtract a root mean square voltage reference value of the three-phase voltage from the quadrature voltage value.

3. The control circuit of claim 1, further comprising a first conversion circuit configured to receive the three-phase voltage and to determine the three-phase voltage into the direct voltage value and the quadrature voltage value.

4. The control circuit of claim 3, further comprising a second conversion circuit configured to generate a three-phase current based at least in part on the feed forward current.

5. The control circuit of claim 1, further comprising a processing component configured to determine the direct current value, $I_{ds}(s)$, and the quadrature current value, $I_{qs}(s)$, using equations:

$$\begin{cases} I_{qs}(s) = \frac{L_s s + r_s}{L_s^2 s^2 + 2r_s L_s s + r_s^2 + (\omega L_s)^2} V_{qs}(s) + \\ \qquad\qquad \frac{-\omega L_s}{L_s^2 s^2 + 2r_s L_s s + r_s^2 + (\omega L_s)^2} V_{ds}(s) \\ I_{ds}(s) = \frac{\omega L_s}{L_s^2 s^2 + 2r_s L_s s + r_s^2 + (\omega L_s)^2} V_{qs}(s) + \\ \qquad\qquad \frac{L_s s + r_s}{L_s^2 s^2 + 2r_s L_s s + r_s^2 + (\omega L_s)^2} V_{ds}(s) \\ I_{0s}(s) = \frac{1}{L_s s + r_s} V_{0s}(s) \end{cases}$$

6. The control circuit of claim 1, wherein the control circuit is embodied in a power system sub-synchronous oscillation damper.

7. The control circuit of claim 1, wherein the fundamental frequency is 60 Hz.

8. A sub-synchronous oscillation damper comprising:
a power input configured to receive an input three-phase voltage;
a control circuit comprising:
a control circuit input configured to receive a direct voltage value and a quadrature voltage value, wherein both the direct voltage value and the quadrature voltage value are based on the input three-phase voltage;
at least one controller configured to determine a direct current value and a quadrature current value based at least in part on the direct voltage value, the quadrature voltage value and a voltage phase angle derived from a phase lock loop (PLL); and a control circuit output configured to send the direct current value and the quadrature current value as feed forward signals, wherein the control circuit is configured to provide low impedance at sub-synchronous frequencies and high impedance at a fundamental frequency.

9. The sub-synchronous oscillation damper of claim 8, wherein the damper is connected between the wind farm collector station and the series compensated lines in a power transmission system.

10. The sub-synchronous oscillation damper of claim 8, wherein the control circuit further comprises a processing component configured to subtract a root mean square voltage reference value of the three-phase voltage from the quadrature voltage value.

11. The sub-synchronous oscillation damper of claim 8, wherein the control circuit further comprises a first conversion circuit configured to determine the three-phase voltage into the direct voltage value and the quadrature voltage value based at least in part on the three-phase voltage.

12. The sub-synchronous oscillation damper of claim 8, further comprising a processing component configured to determine the direct current value, $I_{ds}(s)$, and the quadrature current value, $I_{qs}(s)$, using:

$$\begin{cases} I_{qs}(s) = \frac{L_s s + r_s}{L_s^2 s^2 + 2r_s L_s s + r_s^2 + (\omega L_s)^2} V_{qs}(s) + \\ \qquad \frac{-\omega L_s}{L_s^2 s^2 + 2r_s L_s s + r_s^2 + (\omega L_s)^2} V_{ds}(s) \\ I_{ds}(s) = \frac{\omega L_s}{L_s^2 s^2 + 2r_s L_s s + r_s^2 + (\omega L_s)^2} V_{qs}(s) + \\ \qquad \frac{L_s s + r_s}{L_s^2 s^2 + 2r_s L_s s + r_s^2 + (\omega L_s)^2} V_{ds}(s) \\ I_{0s}(s) = \frac{1}{L_s s + r_s} V_{0s}(s) \end{cases}$$

13. An apparatus, comprising at least one processor; and at least one memory including computer program code, the at least one memory and the computer program code configured to, with the at least one processor, cause the apparatus to perform at least the following:

to receive a direct voltage value and a quadrature voltage value, wherein both the direct voltage value and the quadrature voltage value are based on an input three-phase voltage; and to generate a direct current value and a quadrature current value based at least in part on the direct voltage value, the quadrature voltage value and a voltage phase angle derived from a phase lock loop (PLL); and to output feed forward signals based on the direct current value and the quadrature current value, wherein the feed forward signals instruct low impedance to be provided at sub-synchronous frequencies and high impedance to be provided at a fundamental frequency.

14. The apparatus of claim 13, wherein the at least one memory and the computer program code are further configured to cause the apparatus to subtract a root mean square voltage reference value of the three-phase voltage from the quadrature voltage value.

15. The apparatus of claim 13, wherein the at least one memory and the computer program code are further configured to cause the apparatus to determine the direct voltage value and the quadrature voltage value based one the three-phase voltage.

16. The apparatus of claim 13, wherein the at least one memory and the computer program code are further configured to cause the apparatus to determine the direct current value, $I_{ds}(s)$, and the quadrature current value, $I_{qs}(s)$, using:

$$\begin{cases} I_{qs}(s) = \frac{L_s s + r_s}{L_s^2 s^2 + 2r_s L_s s + r_s^2 + (\omega L_s)^2} V_{qs}(s) + \\ \qquad \frac{-\omega L_s}{L_s^2 s^2 + 2r_s L_s s + r_s^2 + (\omega L_s)^2} V_{ds}(s) \\ I_{ds}(s) = \frac{\omega L_s}{L_s^2 s^2 + 2r_s L_s s + r_s^2 + (\omega L_s)^2} V_{qs}(s) + \\ \qquad \frac{L_s s + r_s}{L_s^2 s^2 + 2r_s L_s s + r_s^2 + (\omega L_s)^2} V_{ds}(s) \\ I_{0s}(s) = \frac{1}{L_s s + r_s} V_{0s}(s) \end{cases}$$

\* \* \* \* \*